United States Patent
Lee et al.

(10) Patent No.: US 9,361,689 B2
(45) Date of Patent: Jun. 7, 2016

(54) IMAGE PROCESSING APPARATUS AND METHOD

(71) Applicant: SAMSUNG ELECTRONICS CO., LTD., Suwon-si (KR)

(72) Inventors: Seok Lee, Hwaseong-si (KR); Ho Cheon Wey, Seongnam-si (KR); Dong Kyung Nam, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 172 days.

(21) Appl. No.: 13/747,822

(22) Filed: Jan. 23, 2013

(65) Prior Publication Data

US 2013/0195348 A1 Aug. 1, 2013

Related U.S. Application Data

(60) Provisional application No. 61/591,347, filed on Jan. 27, 2012.

(30) Foreign Application Priority Data

Sep. 28, 2012 (KR) .................. 10-2012-0108618

(51) Int. Cl.
  *G06T 7/00* (2006.01)
  *G03H 1/08* (2006.01)
(52) U.S. Cl.
  CPC ............ *G06T 7/0022* (2013.01); *G03H 1/0808* (2013.01); *G03H 2001/0825* (2013.01); *G03H 2210/441* (2013.01); *G03H 2210/452* (2013.01)
(58) Field of Classification Search
  None
  See application file for complete search history.

(56) References Cited

U.S. PATENT DOCUMENTS

| 5,625,705 | A  | * | 4/1997  | Recht  ............................. 382/128 |
| 6,433,839 | B1 | * | 8/2002  | Siefken ......................... 348/700 |
| 8,633,969 | B2 | * | 1/2014  | Silveira .............. G02B 27/0025 348/46 |
| 2002/0191113 | A1 | * | 12/2002 | Siefken ......................... 348/700 |
| 2004/0236549 | A1 | * | 11/2004 | Dalton ............................. 703/2 |
| 2009/0303559 | A1 | * | 12/2009 | Rosen et al. ....................... 359/9 |
| 2012/0008822 | A1 | * | 1/2012  | Shirakura et al. .............. 382/100 |

FOREIGN PATENT DOCUMENTS

| DE | WO2011128366    | * | 10/2011 | ............... H04N 7/26 |
| DE | WO 2011128366 A1| * | 10/2011 | ............... H04N 7/26 |
| JP | 10-222046       |   | 8/1998  |                         |
| JP | 2000-122514     |   | 4/2000  |                         |
| JP | 2000122514 A    | * | 4/2000  | ............... G03H 1/08 |
| JP | 2005-62366      |   | 3/2005  |                         |
| JP | 2005-181854     |   | 7/2005  |                         |
| JP | 2012-8220       |   | 1/2012  |                         |
| KR | 10-0837365      |   | 6/2008  |                         |
| KR | 10-2009-0088047 |   | 8/2009  |                         |
| KR | 10-0973031      |   | 7/2010  |                         |
| KR | 10-2011-0127981 |   | 11/2011 |                         |

* cited by examiner

*Primary Examiner* — Utpal Shah
*Assistant Examiner* — Mai Tran
(74) *Attorney, Agent, or Firm* — NSIP Law

(57) ABSTRACT

An image processing apparatus is provided. The image processing apparatus may include a determining unit configured to determine at least one pixel having a pixel value difference between a first image and a second image lower than a critical value, among a plurality of input frame images to compute a hologram pattern, and a computing unit configured to compute a hologram pattern of the first image and to compute a hologram pattern of the second image using a computation result for the at least one pixel of the first image.

20 Claims, 9 Drawing Sheets

IMAGE PROCESSING APPARATUS AND METHOD

CROSS-REFERENCE TO RELATED APPLICATIONS

This application claims the benefit of Korean Patent Application No. 10-2012-0108618, filed on Sep. 28, 2012 in the Korean Intellectual Property Office, and U.S. Provisional Application 61/591,347 filed Jan. 27, 2012 in USPTO, the disclosures of which are incorporated herein by reference.

BACKGROUND

1. Field

Example embodiments relate to an image processing apparatus and method, and more particularly, to an apparatus and method for generating a hologram pattern of a video from discrete space object data and intensity/depth image data.

2. Description of the Related Art

A hologram is a three-dimensional (3D) image of an object that is reproduced accurately by recording phases as well as the light intensity of light waves. Due to low visual fatigue and no limitations on number of viewpoints, the hologram touted as an ideal 3D space representation. Holograms are gaining attention as being essential for next generation realistic 3D representation.

Since a space of a real world has an indefinite number of points, an indefinite number of element patterns is required to generate a hologram. However, in practice, a hologram may be generated and displayed using a discrete number of points representing a space object due to human visual characteristics and a physical limit of pixel pitch in a hologram display device, for example, a spatial light modulator (SLM).

Among various types of holograms generated using various methods, a computer-generated hologram (CGH) may be obtained by modeling and digitally computing a space object, for example, by generating an interference pattern or fringe pattern through approximation of an optical signal and mathematical computation using a computing device, and by displaying the pattern. This concept was introduced by Brown and Lohmann in 1966.

This digital hologram technology is based on generating a hologram pattern for a 3D object by computing a hologram pattern for each point in the object consisting of a collection of space points, and by synthesizing the hologram patterns. Since the hologram pattern requires a video throughput rate of 30 frames or more per second, fast hologram generation poses an issue at present.

SUMMARY

The foregoing and/or other aspects are achieved by providing an image processing apparatus including a determining unit configured to determine at least one pixel having a pixel value difference between a first image and a second image lower than a critical value, among a plurality of input frame images to compute a hologram pattern, and a computing unit configured to compute a hologram pattern of the first image and to compute a hologram pattern of the second image using a computation result for the at least one pixel of the first image.

The determining unit may be configured to generate a mask for distinguishing the at least one pixel from at least one other pixel, and the computing unit may be configured to compute, by referring to the mask, a hologram pattern of a pixel, other than the at least one pixel in the second image, and to compute a hologram pattern of the at least one pixel of the second image using the computation result for the first image.

The pixel value may include at least one of an intensity value and a depth value.

The image processing apparatus may further include a grouping unit configured to group the plurality of frame images to create a plurality of frame groups, the group including N frame images, N being a natural number, and to select, to be the first image, an image having an earliest time index in N frame images of a first group among the plurality of frame groups.

The foregoing and/or other aspects are achieved by providing an image processing apparatus including a grouping unit configured to group a plurality of frame images to create a plurality of frame groups, the group including N frame images, N being a natural number, when the plurality of frame images are inputted to compute a hologram pattern, a determining unit configured to determine at least one pixel having a pixel value difference lower than a critical value by comparing pixels of the N frame images included in a first group among the plurality of frame groups, and a computing unit configured to compute a hologram pattern of a pixel, other than the at least one pixel of the N frame images included in the first group, and to compute a hologram pattern of the at least one pixel of one frame image among the N frame images and to copy the computed hologram pattern to a hologram pattern of the other frame image.

The foregoing and/or other aspects are achieved by providing an image processing apparatus including a determining unit configured to divide a first image and a second image into blocks among a plurality of input frame images to compute a hologram pattern, and to determine at least one block having a pixel value difference between the blocks of the first image and the second image lower than a critical value, and a computing unit configured to compute a hologram pattern of the first image, and to compute a hologram pattern of the second image using a computation result for the at least one block of the first image.

The foregoing and/or other aspects are achieved by providing an image processing method including determining at least one pixel having a pixel value difference between a first image and a second image lower than a critical value, among a plurality of frame images used to compute a hologram pattern, and computing a hologram pattern of the first image, and computing a hologram pattern of the second image using a computation result for the at least one pixel of the first image.

The determining of the at least one pixel may include generating a mask for distinguishing the at least one pixel from at least one other pixel, and the computing of the hologram pattern of the second image using the computation result for the at least one pixel of the first image may include computing, by referring to the mask, a hologram pattern of a pixel, other than the at least one pixel in the second image, and computing a hologram pattern of the at least one pixel of the second image using the computation result for the first image.

The pixel value may include at least one of an intensity value and a depth value.

The image processing method may further include grouping the plurality of frame images to create a plurality of frame groups, the group including N frame images, N being a natural number, and selecting, to be the first image, an image having an earliest time index in N frame images of a first group among the plurality of frame groups.

The foregoing and/or other aspects are achieved by providing an image processing method including dividing a first image and a second image into blocks among a plurality of input frame images to compute a hologram pattern, and determining at least one block having a pixel value difference between the blocks of the first image and the second image lower than a critical value, and computing a hologram pattern of the first image, and computing a hologram pattern of the second image using a computation result for the at least one block of the first image.

The foregoing and/or other aspects are achieved by providing an image processing apparatus including a determining unit to generate a mask for distinguishing a pixel, having a pixel value difference between a first frame image and a second frame image lower than a threshold, from at least one other pixel, among a plurality of frame images and a computing unit to compute a hologram pattern of a second frame image of the plurality of frame images using a computation result of the pixel of the first frame image of the plurality of frame images by referring to the mask generated by the determining unit.

The foregoing and/or other aspects are achieved by providing an image processing method. The image processing method includes selecting a first frame image of a group of frame images to be a reference frame, generating a mask for distinguishing a pixel in the first frame image from at least one other pixel, and computing a hologram pattern of a second frame image of the group of frame images other than the reference frame using a computation result of the pixel in the first frame image by referring to the generated mask.

The foregoing and/or other aspects are achieved by providing an image processing apparatus including a determining unit to generate a mask for distinguishing a first pixel having a first pixel value difference between a first frame image and a second frame image lower than a threshold, from a second pixel having a second pixel value difference between the first frame image and the second frame image equal to or greater than the threshold, among a plurality of frame images, and a computing unit to compute a hologram pattern of a pixel of the second frame image of the plurality of frame images using a computation result of a hologram pattern of the first frame image when the first pixel value difference is less than the threshold and to compute a hologram pattern of a pixel other than the pixel of the second frame image without using the computation result of the hologram pattern of the first frame image when the second pixel value difference is equal to or greater than the threshold.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
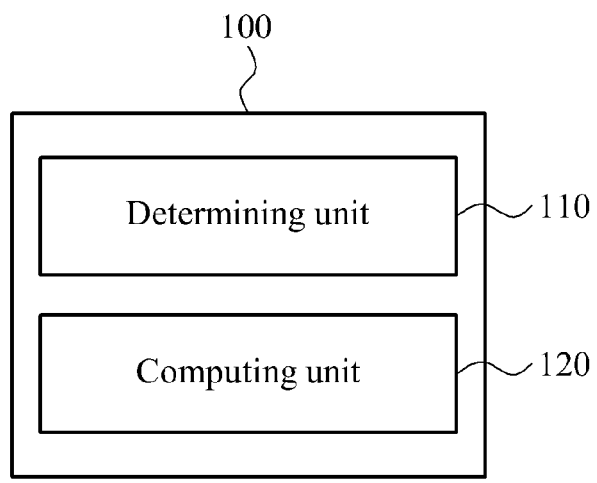
FIG. 1 illustrates an image processing apparatus according to an example embodiment.

Reference will now be made in detail to exemplary embodiments of the present disclosure, examples of which are illustrated in the accompanying drawings wherein like reference numerals refer to the like elements throughout. The embodiments herein and the various features and advantageous details thereof are explained more fully with reference to the non-limiting embodiments that are illustrated in the accompanying drawings and detailed in the following description.

Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Unless otherwise defined, all terms, including technical and scientific terms, used herein have the same meaning as that commonly understood by one of ordinary skill in the art to which the present disclosure belongs. It will be further understood that terms, such as those defined in commonly used dictionaries, should be interpreted as having a meaning that is consistent with their meaning in the context of the relevant art and this disclosure and will not be interpreted in an idealized or overly formal sense unless expressly so defined herein.

The term "first image" used herein may refer to a reference frame image among a plurality of input frame images to compute a hologram pattern, and is also termed a reference frame. The first image mainly corresponds to an image having an earliest time index among the plurality of input frame images to compute the hologram pattern. That is, the first image may correspond to a first input frame image among the plurality of input frame images to compute the hologram pattern.

The term "second image" used herein may refer to a frame image, other than the first image, among the plurality of input frame images to compute the hologram pattern, and is also termed a difference frame.

The term "pixel value" used herein may include at least one of an intensity value and a depth value for each pixel included in each frame image. That is, the term "pixel value" may include either one of an intensity value or a depth value, or both, for each pixel included in each frame image. The pixel value may be determined based on at least one of the intensity value and the depth value at each coordinate point of the first image and the second image, and a pixel value difference may be calculated by comparing the pixel values of the first image and the second image at the same coordinate point.

The pixel value should not be interpreted as limiting the scope of the disclosure, and unless otherwise defined, may have an arbitrary value as a reference for determining a pixel value difference between the frame images.

The term "mask" used herein refers to a pattern generated to distinguish a pixel in which a hologram pattern of the second image may be computed using a computation result for the first image, from another pixel in which a hologram pattern may be computed separately to compute the hologram pattern of the second image.

In the mask, a pixel having a pixel value difference between the first image and the second image less than a critical value may correspond to an area in which the computation result for the first image may be used to compute the hologram pattern of the second image.

A pixel having a pixel value difference between the first image and the second image greater than or equal to the critical value may correspond to an area in which separate computation may be executed to compute the hologram pattern of the second image. In an embodiment, the execution of the separate computation may include computing a hologram pattern of the second image without using the computation result for the first image.

FIG. 1 illustrates an image processing apparatus 100 according to an example embodiment.

Referring to FIG. 1, the image processing apparatus 100 may include, for example, a determining unit 110 and a computing unit 120.

The determining unit 110 may determine at least one pixel having a pixel value difference between a first image and a second image lower than a critical value, among a plurality of input frame images, to compute a hologram pattern.

The determining unit 110 may generate a mask for distinguishing the at least one pixel from at least one other pixel.

Here, the pixel value may include at least one of an intensity value and a depth value for each pixel of the frame image.

The computing unit 120 may compute a hologram pattern of the first image, and may compute a hologram pattern of the second image using a computation result for the at least one pixel of the first image determined by the determining unit 110.

The computing unit 120 may compute a hologram pattern of a pixel separately, other than the at least one pixel, for example, a pixel having the pixel value difference greater than or equal to the critical value, by referring to the mask generated by the determining unit 110. The computing unit 120 may synthesize the hologram pattern of the at least one pixel and the separately computed hologram pattern of the at least one other pixel to generate the hologram pattern of the second image.

According to other embodiments, the image processing apparatus 100 may divide the frame image into blocks, and may compute a hologram pattern for each block with reduced redundancy.

In this case, the determining unit 110 may divide each of the first image and the second image into blocks, among the plurality of input frame images, to compute the hologram pattern, and may determine at least one block having a pixel value difference between the blocks of the first image and the blocks of the second image.

The computing unit 120 may compute a hologram pattern of the first image, and may compute a hologram pattern of the second image using a computation result for the at least one block of the first image.

Figure 2:
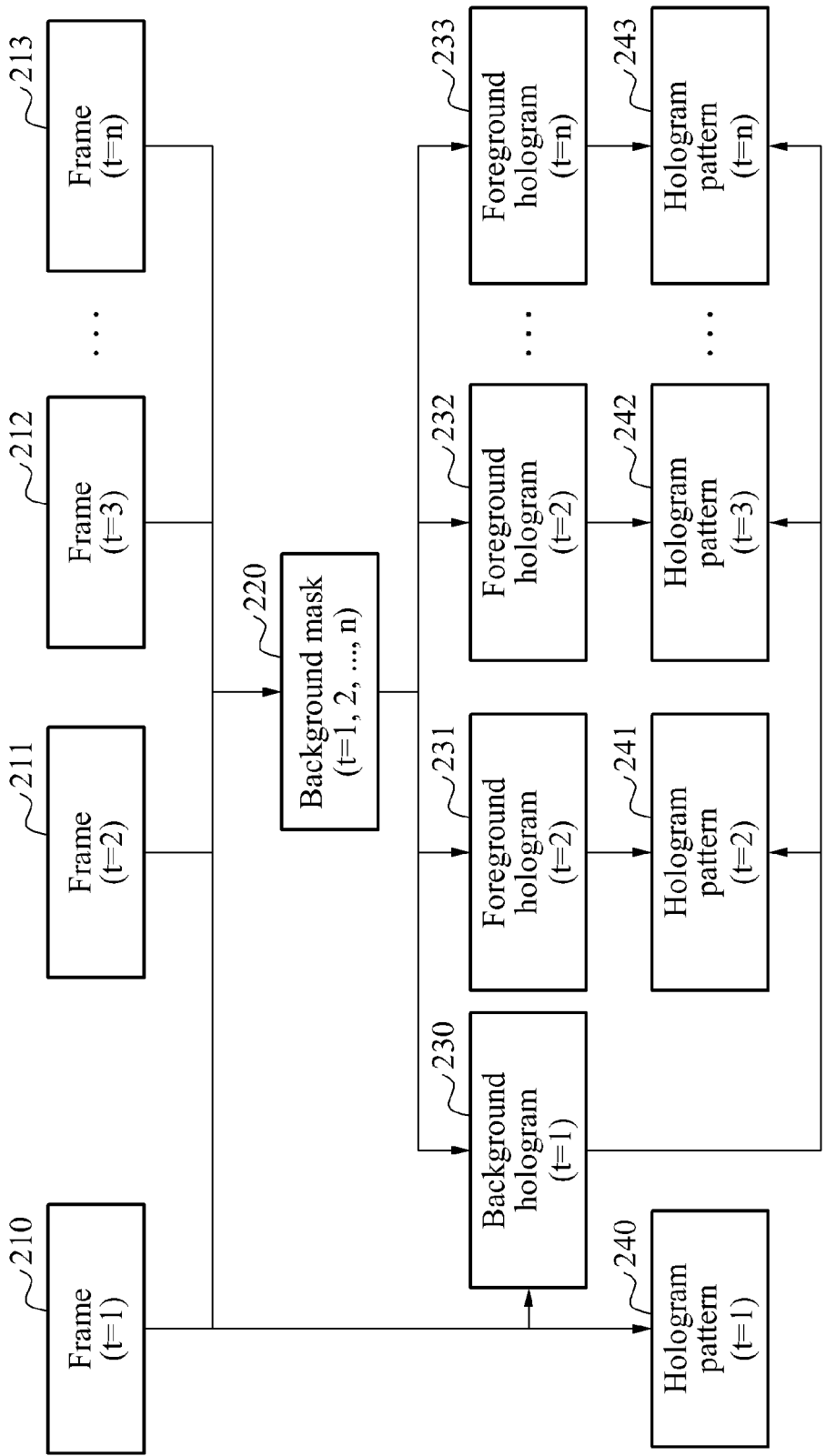
FIG. 2 illustrates an example of generating a hologram pattern for a sequence of input N frame images according to an example embodiment.

FIG. 2 illustrates an example of generating a hologram pattern for a sequence of input N frame images according to an example embodiment.

Among the input N frame images 210 through 213 to compute a hologram pattern, an image 210 having an earliest time index may be determined to be a first image, and any one of the other images 211, 212, and 213 may be determined to be a second image.

The determining unit 110 of FIG. 1 may compare a pixel value for each coordinate point of the second images 211 through 213 to a pixel value for each corresponding coordinate point of the first image 210, and may generate a mask 220 using a pixel value difference based on a critical value.

The pixel value difference may be calculated through Equation 1 below:

$$\text{if, } |L[1](i,j)-L[2](i,j)|<d\_L \text{ OR } |D[1](i,j)-D[2](i,j)|<d\_D, M(i,j)=0$$

$$\text{else, } M(i,j)=1 \quad\quad\quad [\text{Equation 1}]$$

The pixel value may include at least one of an intensity value and a depth value for each pixel, and the intensity values of the first image and the second image are represented by L[1] and L[2] and the depth values of the first image and the second image are represented by D[1] and D[2], respectively.

When an intensity value difference between the first image and the second image at coordinates (i, j) is lower than a critical value d_L, or when a depth value difference between the first image and the second image at coordinates (i, j) is lower than a critical value d_D, a mask value M(i, j) may be set to be '0' and a corresponding portion of the mask 220 may be seen in black.

When the intensity value difference or the depth value difference between the first image and the second image at the coordinates (i, j) is greater than the critical value d_L or d_D, the mask value M(i, j) may be set to be '1' and a corresponding portion of the mask 220 may be provided in white.

The black area of the mask 220 may be understood to be an area in which a computation result for the first image may be used to compute a hologram pattern of the second image, and the white area may be understood to be an area in which a separate computation may be executed to compute the hologram pattern of the second image, and the mask 220 may be referred to when computing the hologram pattern of the second image. In an embodiment, the separate computation may refer to a computation in which a computation result for the first image is not used to compute a hologram pattern of the second image.

In another embodiment, in Equation 1, an OR operation may be replaced by an AND operation. In this embodiment, the mask value M(i, j) may be set to be '1' and a corresponding portion of the mask 220 may be seen in black only when both the intensity value difference and the depth value difference are lower than the critical values d_L and d_D.

After the mask 220 is generated, the computing unit 120 may compute the hologram pattern of the second image based on the mask value calculated by way of Equation 1.

In an area corresponding to the portion having the mask value of '0' provided in black, a background hologram 230 may be generated, and the computation result for the first image may be used to compute the hologram pattern of the second image.

In an area corresponding to the portion having the mask value of '1' provided in white, foreground holograms 231 through 233 may be generated, and separate computation may be executed to compute the hologram pattern of the second image. In an embodiment, the execution of the separate computation may include computing a hologram pattern of the second image without using the computation result for the first image.

The determining unit 110 may generate the background hologram 230 in the area having the pixel value difference between the first image and the second image lower than the critical value, and the foreground holograms 231 through 233 in the area having the pixel value difference greater than or equal to the critical value.

The computing unit 120 of FIG. 1 may compute a hologram pattern 240 for all pixels of the first image 210, irrespective of a background and a foreground.

The computing unit 120 may compute the background hologram 230 of the second images 211 through 213 using the computation result for the first image 210, and may compute the foreground holograms 231 through 233 separately.

The computing unit 120 may synthesize the background hologram 230 and the foreground holograms 231 through 233 to generate hologram patterns 241 through 243 of the second image.

Figure 3:
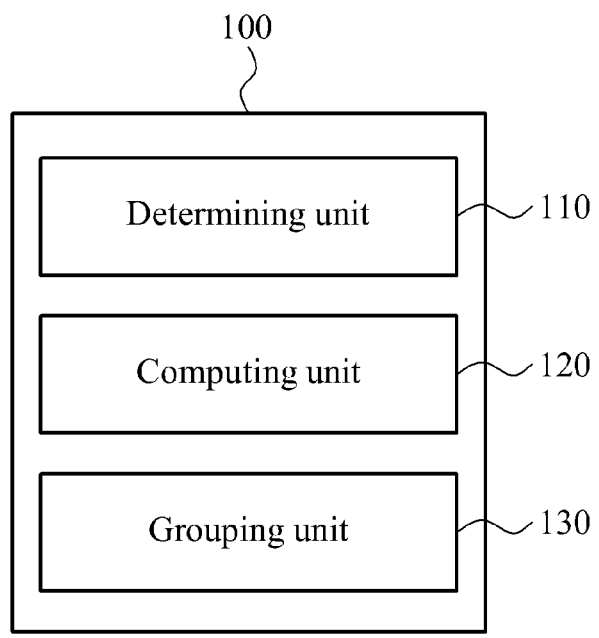
FIG. 3 illustrates an extension of an image processing apparatus according to an example embodiment.

FIG. 3 illustrates an extension of the image processing apparatus 100 according to an example embodiment.

Referring to FIG. 3, an extension of the image processing apparatus 100 may include, for example, the determining unit 110, the computing unit 120, and a grouping unit 130.

The grouping unit 130 may group a plurality of input frame images to compute a hologram pattern to create a plurality of frame groups, each group including N frame images, N being a natural number.

The grouping unit 130 may select, to be a first image, an image having an earliest time index in N frame images of a first group among the plurality of frame groups.

The determining unit 110 may determine at least one pixel having a pixel value difference lower than a critical value by comparing pixels of the N frame images included in the first group.

The pixel value may include at least one of an intensity value and a depth value for each pixel of the frame image.

For a pixel other than the at least one pixel, the computing unit 120 may compute a hologram pattern for each of the N frame images included in the first group.

For the at least one pixel, the computing unit 120 may compute a hologram pattern of one frame image among the N frame images included in the first group, and may copy the computed hologram pattern to a hologram pattern of another frame image.

Figure 4:
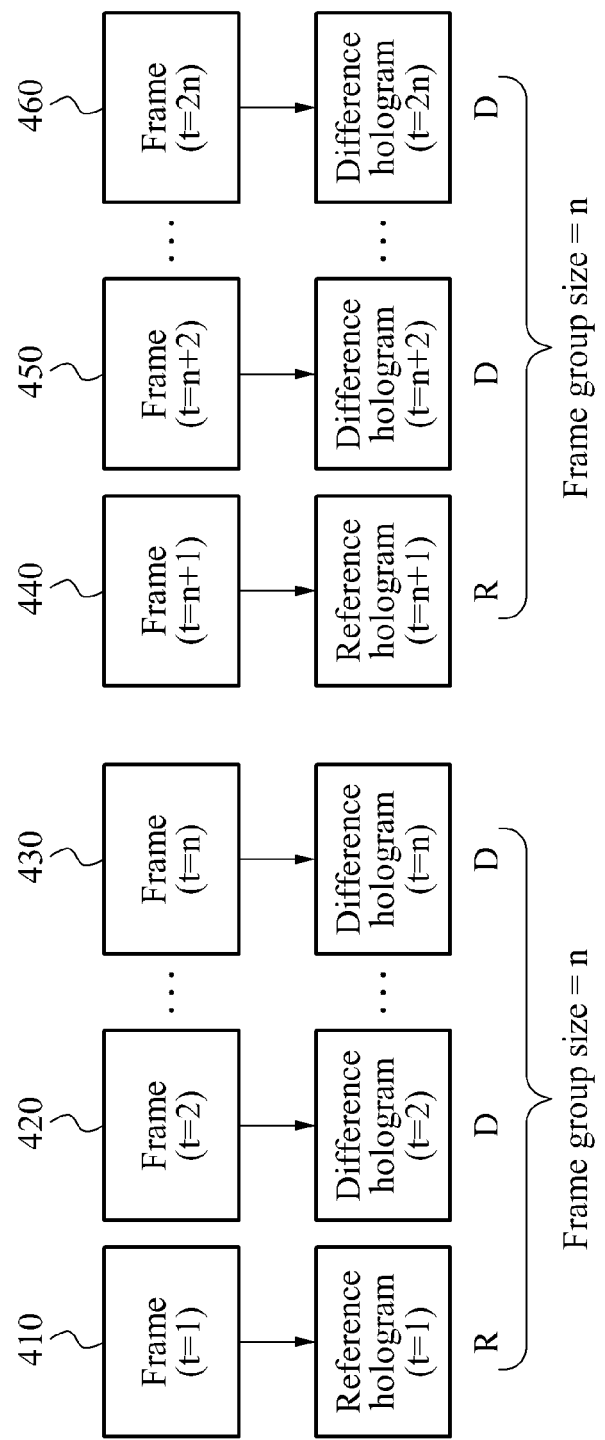
FIG. 4 illustrates an example of generating a hologram pattern for each frame group including N frame images according to an example embodiment.

FIG. 4 illustrates an example of generating a hologram pattern for each frame group including N frame images according to an example embodiment.

The grouping unit 130 may group a plurality of input frame images 410 through 460 to compute a hologram pattern to create a plurality of frame groups, each group including N frame images.

Referring to FIG. 4, the plurality of frame images 410 through 460 may be grouped into a first group including frame images 410 through 430 and a second group including frame images 440 through 460.

Among N frame images of the first group, an image having an earliest time index may be selected to be a reference frame, and may be understood as corresponding to the first image.

An image other than the reference frame among the frame images included in the first group may be set to be a difference frame, and may be understood as corresponding to the second image.

To generate a hologram pattern for the reference frame 410, that is, a reference hologram, hologram patterns for all pixels of the frame may be computed, and may correspond to the hologram pattern 240 of FIG. 2.

To generate a hologram pattern for each of the difference frames 420 and 430, that is, a difference hologram, a hologram pattern for a background may be computed using data of the reference hologram, and may correspond to the background hologram 230 of FIG. 2, and a hologram pattern for a foreground may be computed separately, and may correspond to the foreground holograms 231 through 233 of FIG. 2.

The difference holograms may correspond to the hologram patterns 241 through 243 of FIG. 2.

Figure 5:
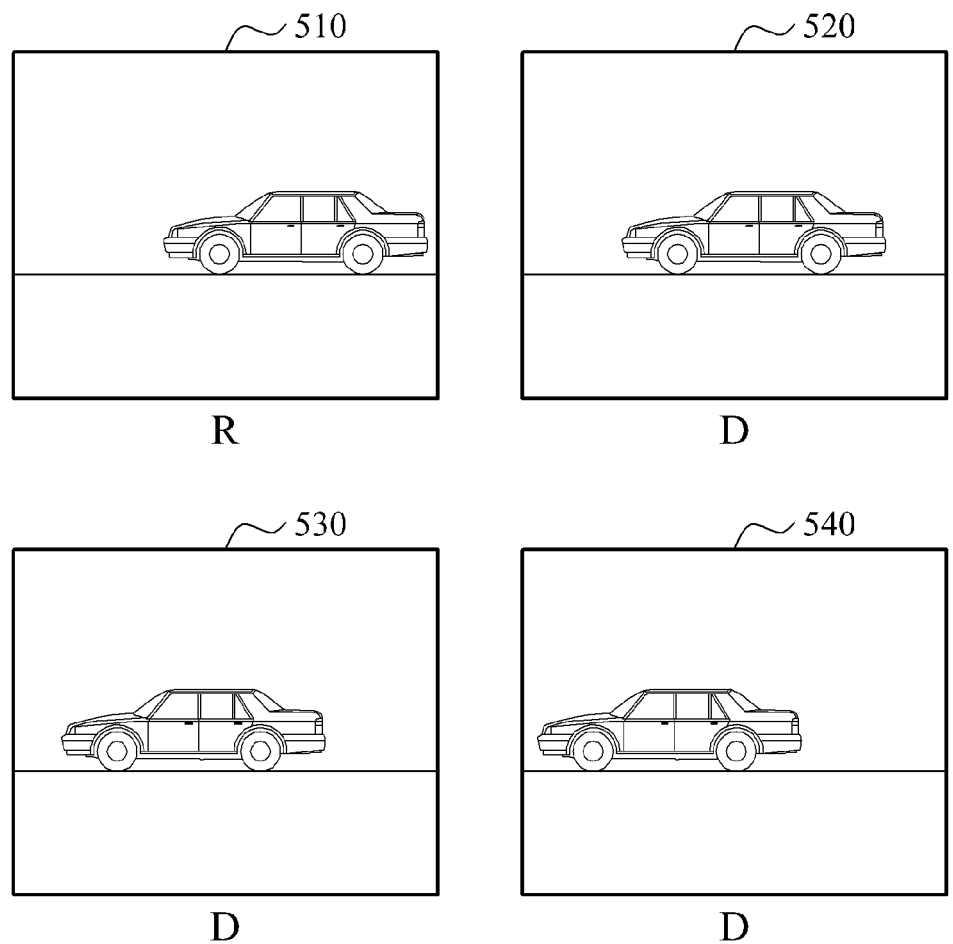
FIG. 5 illustrates an example of a sequence of input frame images to compute a hologram pattern according to an example embodiment.
Figure 6:
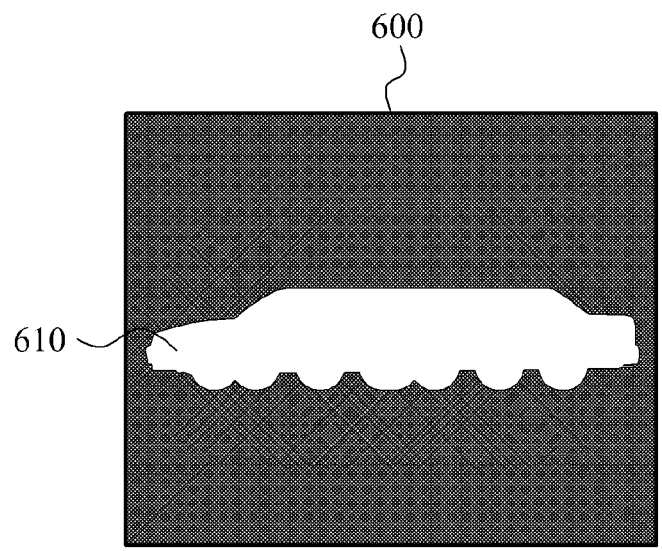
FIG. 6 illustrates an example of a mask for generating a hologram pattern according to an example embodiment.

FIG. 5 illustrates an example of a sequence of input frame images to compute a hologram pattern according to an example embodiment. FIG. 6 illustrates an example of a mask for generating a hologram pattern according to an example embodiment.

In FIG. 5, a sequence of four frame images of a scene representing a moving car are illustrated as an example.

Among the four frame images, an image 510 having an earliest time index may be determined to be a first image, or a reference frame R, and the other three images 520 through 540 may be determined to be a second image, or a difference frame D.

A hologram pattern of the first image 510 may be computed for all pixels of the frame.

A hologram pattern for each of the second images 520 through 540 may be computed using a pixel value difference between the first image 510 and each of the second images 520 through 540 at each coordinate point based on a critical value. In an embodiment, the pixel value difference refers to a difference between a pixel value of the first image and a corresponding pixel value of one of the second images 520 through 540.

In an area having the pixel value difference lower than the critical value, the computation result for the first image may be used to compute the hologram pattern of the second image, and in an area having the pixel value difference greater than or equal to the critical value, separate computation may be executed to compute the hologram pattern of the second image. In an embodiment, the execution of the separate computation may include computing a hologram pattern of the second image without using the computation result for the first image.

Referring to FIG. 6, a mask 600 generated using the pixel value difference based on the critical value is illustrated.

A black area of the mask 600 may be an area in which the computation result for the first image 510 may be used to compute the hologram pattern of the second image.

A white area 610 may be an area in which separate computation may be executed to compute the hologram pattern of the second image, and may correspond to the car area with pixel values changing in the example of the four frame images of FIG. 5.

Figure 7:
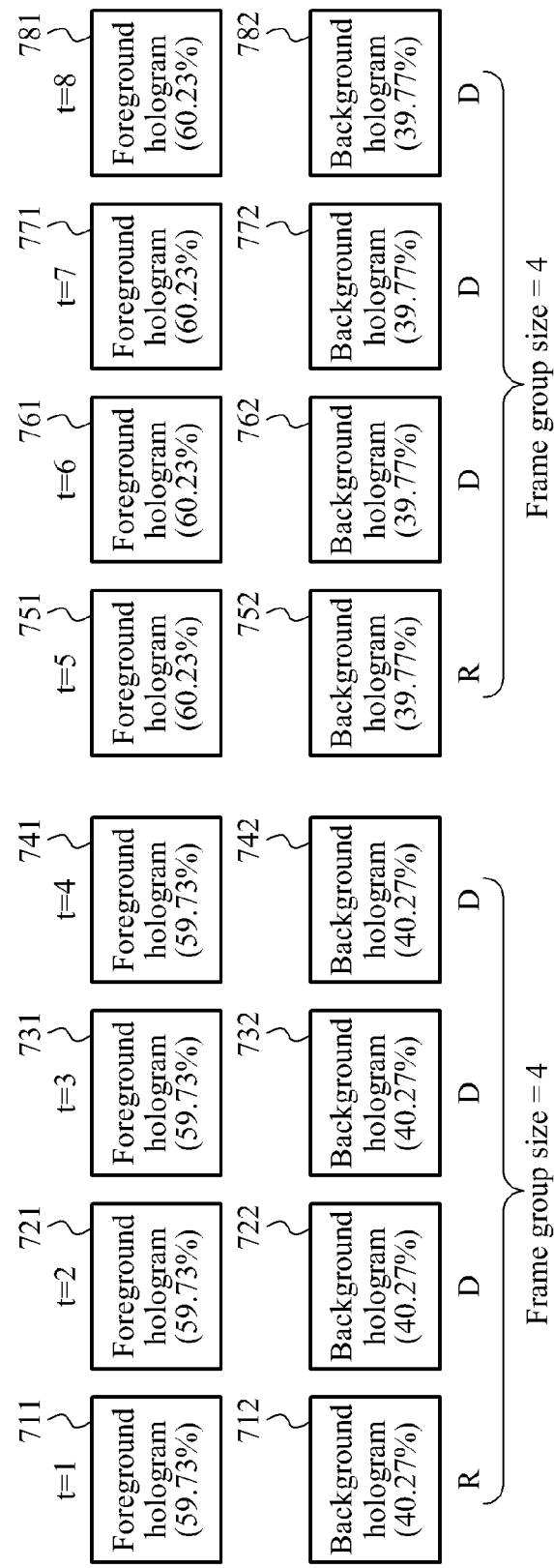
FIG. 7 illustrates data computation involved in hologram pattern generation for a frame image according to an example embodiment.

FIG. 7 illustrates data computation involved in hologram pattern generation for a frame image according to an example embodiment.

When eight frame images are inputted, a conventional method computes hologram patterns for all pixels included in each of the eight frame images.

For example, when an amount of computation per frame is 100, the conventional method requires a total amount of computation of 800 to compute the hologram patterns for all the eight frames, absent redundancy removal.

According to an example embodiment of FIG. 7, the eight frame images may be grouped into a first group and a second group, each group including four frame images when a size of a frame group is set to be 4, and a hologram pattern may be computed for each frame group.

A frame image having an earliest time index in the first group may be selected to be a first image or reference frame for the first group, and a hologram pattern of the first image may be computed for all pixels, irrespective of a background and a foreground.

To compute a hologram pattern of the second image or difference frame in the first group, foreground holograms 721 through 741 may be computed separately, that is without using the computation result for the first image, and background holograms 722 through 742 may be computed using the computation result for the first image.

Similar to the first group, to compute the hologram pattern of the second group, a hologram pattern of a first image may be computed for all pixels in the frame, and foreground holograms 751 through 781 of a second image may be computed separately, that is without using the computation result for the first image of the second group, and background holograms 752 through 782 may be computed using the computation result for the first image of the second group.

In this case, when an amount of computation for the background holograms 712 through 742 of the first group is 40.27 and an amount of computation for the background holograms 752 through 782 of the second group is 39.77, the amount of computation for the hologram patterns of the second images of the first group and the second group may be reduced by the amount of computation for the background hologram.

The amount of computation for the hologram pattern according to an example embodiment of FIG. 7 may be represented by Equation 2.

$$[100+(59.73\times3)+(100+(60.23\times3))]=559.88 \quad \text{[Equation 2]}$$

Since both a background hologram and a foreground hologram of the first image is computed for each group, and a background hologram of the second image is computed using data of the first image, a total computation amount is 559.88.

From the total of eight frame images, a ratio of a computation amount after redundancy removal relative to a computation amount before redundancy removal is 70.0%, and thus a reduction in the computation amount of 30% is achieved.

Figure 8:
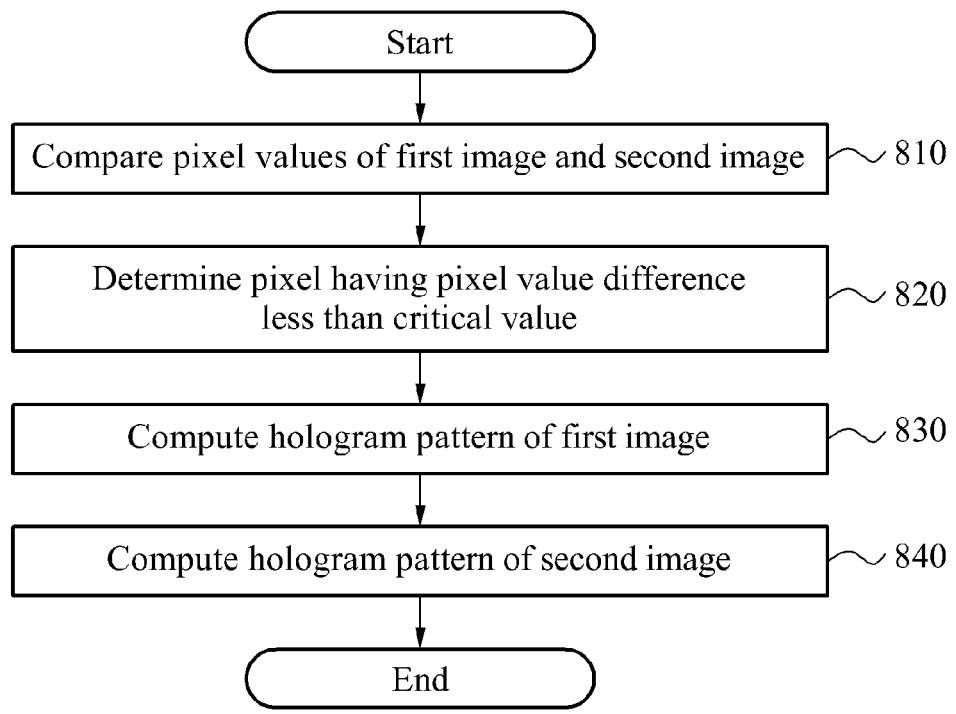
FIG. 8 illustrates an image processing method according to an example embodiment.

FIG. 8 illustrates an image processing method according to an example embodiment.

Referring to FIG. 8, in operation 810, a pixel value of a first image and a pixel value of a second image may be compared among a plurality of input frame images to a hologram pattern.

The pixel value may include at least one of an intensity value and a depth value for each pixel of the frame image.

In operation 820, at least one pixel having a pixel value difference lower than a critical value may be determined.

In this instance, a mask may be generated to distinguish the at least one pixel from at least one other pixel.

The mask may be displayed differently for an area in which a computation result for the first image may be used to compute a hologram pattern of the second image, and an area in which separate computation may be executed to compute the hologram pattern of the second image, and may be referred to when computing the hologram pattern of the second image. In an embodiment, the execution of the separate computation includes computing a hologram pattern of the second image without using the computation result for the first image.

In operation 830, a hologram pattern of the first image may be computed.

In this instance, computation of the hologram pattern of the first image may be performed for all pixels of the first image.

In operation 840, the hologram pattern of the second image may be computed, and in this instance, the hologram pattern of the second image may be computed using a computation result for at least one pixel of the first image.

To compute the hologram pattern of the second image, for a pixel other than the at least one pixel, a hologram pattern may be computed by referring to the mask.

For the at least one pixel, a hologram pattern may be computed using the computation result for the hologram pattern of the first image.

Figure 9:
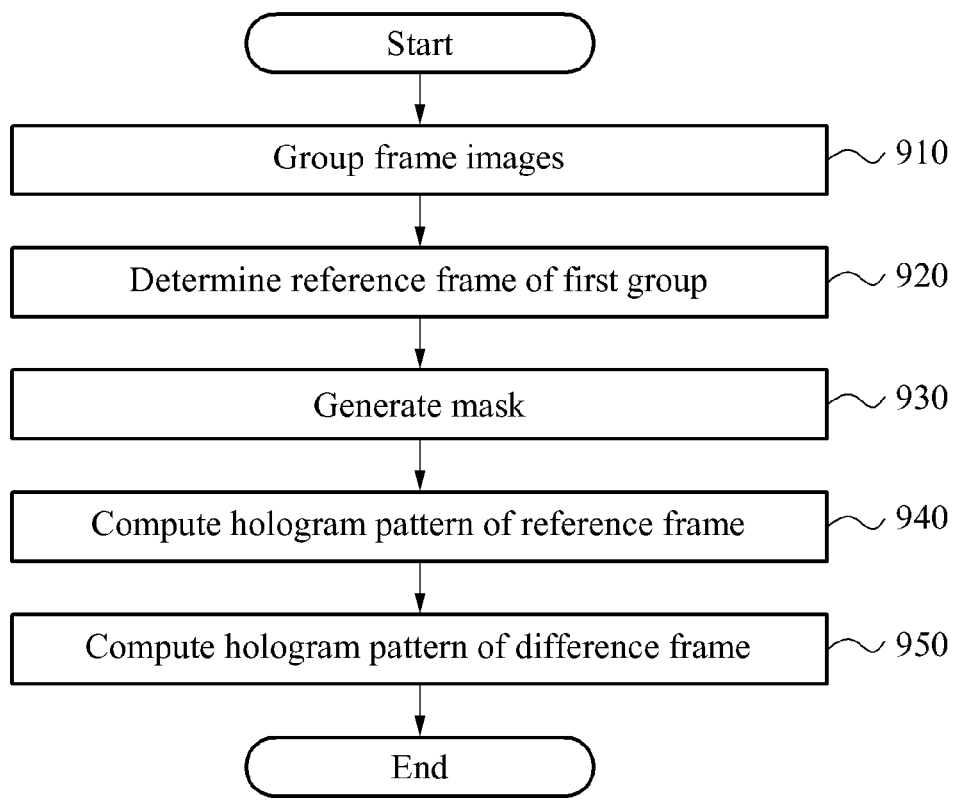
FIG. 9 illustrates an image processing method according to another example embodiment.

FIG. 9 illustrates an image processing method according to another example embodiment.

Referring to FIG. 9, in operation 910, a plurality of input frame images to compute a hologram pattern may be grouped to create a plurality of frame groups, each group including N frame images, N being a natural number.

In operation 920, a first image or a reference frame may be determined among N frame images of a first frame group, as a reference for generating the hologram pattern.

As the first image, an image having an earliest time index may be selected among the N frame images of the first frame group. However, the first image may alternatively be selected arbitrarily based on another selection standard.

A frame image other than the determined first image in the first frame group may be set to be a second image, that is, a difference frame, automatically.

In operation 930, a mask may be generated to distinguish an area in which a computation result for the first image may be used to compute a hologram pattern of the second image, from an area in which separate computation may be executed to compute the hologram pattern of the second image. In an embodiment, the execution of the separate computation may include computing a hologram pattern of the second image without using the computation result for the first image.

The mask may be displayed differently based on a critical value for each pixel value difference calculated by comparing pixel values of the first image and the second image for each pixel corresponding to coordinates.

For a pixel having a pixel value difference lower than the critical value, a hologram pattern of the second image may be computed using a computation result for the first image.

For a pixel other than the at least one pixel, that is, a pixel having a pixel value difference greater than or equal to the critical value, a hologram pattern may be computed separately to compute the hologram pattern of the second image. In an embodiment, the separate computation includes computing a hologram pattern of the second image without using the computation result for the first image.

The pixel value may be determined based on at least one of the intensity value and the depth value for each pixel of the frame image.

In operation 940, a hologram pattern of the first image or the reference frame may be computed.

The computation of the hologram pattern of the first image may be executed for all pixels of the first image.

In operation 950, the hologram pattern of the second image or the difference frame may be computed.

The computation of the hologram pattern of the second image may be executed for only the pixel having the pixel value difference greater than or equal to the critical value, by referring to the mask.

For the at least one pixel having the pixel value difference lower than the critical value, the hologram pattern of the second image may be computed using the computation result for the first image.

According to other embodiments, the frame image may be divided into blocks, and a hologram pattern may be computed for each block with reduced redundancy.

In this case, each of the first image and the second image may be divided into blocks among the plurality of frame images used to compute the hologram pattern, and at least one block having a pixel value difference between the blocks of the first image and the second image may be determined.

A hologram pattern of the first image may be computed, and a hologram pattern of the second image may be computed using a computation result for the at least one block of the first image.

The method according to example embodiments may be recorded in computer-readable media including program instructions to implement various operations embodied by a computer or a processor. The media may also include, alone or in combination with the program instructions, data files, data structures, and the like. Examples of computer-readable media include magnetic media such as hard discs, floppy discs, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present disclosure, or vice versa. Any one or more of the software modules or units described herein may be executed by a dedicated processor unique to that unit or by a processor common to one or more of the modules. The described methods may be executed on a general purpose computer or processor or may be executed on a particular machine such as the image processing apparatus described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An image processing apparatus comprising:
   a processor configured to control one or more processor-executable units;
   a determining unit, controlled by the processor, configured to
      calculate a pixel value difference between a first pixel of a first image and a second pixel or a second image, wherein the first image and the second image are a plurality of input frame images used to compute a hologram pattern, and the first pixel and the second pixel have a same coordinate value,
      determine at least one pixel among a plurality of pixels of the second image, for which the pixel value difference is lower than a critical value, and
      generate a mask of the second image for distinguishing the at least one pixel from at least one other pixel in the mask based on the pixel value difference of each pixel among the plurality of pixels; and
   a computing unit, controlled by the processor, configured to
      compute a hologram pattern of each pixel of the first image, to compute a hologram pattern of the at least one other pixel of the second image, and to
      generate a hologram pattern of each pixel of the second image, by copying at least one hologram pattern of each pixel of the first image based on the at least one pixel of the mask, and using the hologram pattern of the at least one other pixel.

2. The image processing apparatus of claim 1, wherein the computing unit is configured to compute, by referring to the mask, a hologram pattern of a pixel other than the at least one pixel in the second image, and to compute a hologram pattern of the at least one pixel of the second image using the computation result for the first image.

3. The image processing apparatus of claim 1, wherein the pixel value difference includes at least one of an intensity value difference and a depth value difference.

4. The image processing apparatus of claim 1, further comprising:
   a grouping unit, among the one or more processor-executable units, configured to group the plurality of frame images to create a plurality of frame groups, the group including N frame images, N being a natural number, and to select, to be the first image, an image having an earliest time index in N frame images of a first group among the plurality of frame groups.

5. An image processing apparatus comprising:
   a processor configured to control one or more processor-executable units;
   a grouping unit, among the one or more processor-executable units, configured to group a plurality of frame images to create a plurality of frame groups including a first frame group, with each of the frame groups including N frame images, N being a natural number, when the plurality of frame images are inputted to compute a hologram pattern;
   a determining unit, among the one or more processor-executable units, configured to
      calculate a pixel value difference between a first pixel of a first frame image among the N frame images included in the first group, and a second pixel of a second frame image among the N frame images included in the first group, the first pixel and the second pixel have a same coordinate value,
      determine at least one pixel, among a plurality of pixels in the first frame image and the second frame image, for which the pixel value difference is lower than a critical value, and
      generate a mask of the first frame image and the second frame image for distinguishing the at least one pixel from at least one other pixel in the mask based on the pixel value difference of each pixel among the plurality of pixels; and
   a computing unit, among the one or more processor-executable units, configured to compute, by referring to the mask, a hologram pattern of a pixel other than the at least one pixel in the second frame image, and configured to compute a hologram pattern of the at least one pixel in the first frame image and to copy the computed hologram pattern of the first frame image to a hologram pattern of the second frame image.

6. The image processing apparatus of claim 5, wherein the pixel value difference includes at least one of an intensity value difference and a depth value difference.

7. An image processing apparatus comprising:
   a processor device configured to control one or more processor-executable units;
   a determining unit, among the one or more processor-executable units, configured to
      divide a first image and a second image, among a plurality of input frame images used to compute a hologram pattern, into a plurality of blocks,
      calculate, for each block among the plurality of blocks, a pixel value difference between a first pixel of the first image and a second pixel of the second image, wherein the first pixel and the second pixel have a same coordinate value, determine at least one block, among the plurality of blocks, for which the pixel value difference is lower than a critical value, and generate a mask of the input frame images for distinguishing the at least one block from at least one other block in the mask based on the pixel value difference of each block among the plurality of blocks; and a computing unit, among the one or more processor-executable units, configured to compute a hologram pattern of the first image, and to compute a hologram pattern of the second image using a computation result for the at least one block of the first image based on the mask.

8. An image processing method comprising:
calculating a pixel value difference between a first pixel of a first image and a second pixel of a second image, wherein the first image and the second image are a plurality of input frame images used to compute a hologram pattern, and the first pixel and the second pixel have a same coordinate value;
determining at least one pixel among a plurality of pixels of the second image, for which the pixel value difference is lower than a critical value;
generating a mask of the second image for distinguishing the at least one pixel from at least one other pixel in the mask based on the pixel value difference of each pixel among the plurality of pixels;
computing a hologram pattern of each pixel of the first image;
computing a hologram pattern of the at least one other pixel of the second image; and
generating a hologram pattern of each pixel of the second image, by copying at least one hologram pattern of each pixel of the first image based on the at least one pixel of the mask, and using the hologram pattern of the at least one other pixel.

9. The image processing method of claim 8, wherein the computing of the hologram pattern of the second image using the computation result for the at least one pixel of the first image comprises:
computing, by referring to the mask, a hologram pattern of a pixel other than the at least one pixel in the second image; and
computing a hologram pattern of the at least one pixel of the second image using the computation result for the first image.

10. The image processing method of claim 8, wherein the pixel value difference includes at least one of an intensity value difference and a depth value difference.

11. The image processing method of claim 8, further comprising:
grouping the plurality of frame images to create a plurality of frame groups, the group including N frame images, N being a natural number; and
selecting, to be the first image, an image having an earliest time index in N frame images of a first group among the plurality of frame groups.

12. An image processing method comprising:
dividing a first image and a second image, among a plurality of input frame images used to compute a hologram pattern, into a plurality of blocks;
calculating, for each block among the plurality of blocks, a pixel value difference between a first pixel of the first image and a second pixel of the second image, wherein the first pixel and the second pixel have a same coordinate value;
determining at least one block, among the plurality of blocks, for which the pixel value difference is lower than a critical value; and
generating a mask of the input frame images for distinguishing the at least one block from at least one other block in the mask based on the pixel value difference of each block among the plurality of blocks; and
computing a hologram pattern of the first image, and computing, by referring to the mask, a hologram pattern of the second image using a computation result for the at least one block of the first image based on the mask.

13. A non-transitory computer-readable recording medium comprising a program for implementing the image processing method of claim 8.

14. An image processing apparatus comprising:
a processor configured to control one or more processor-executable units;
a determining unit, among the one or more processor-executable units, configured to
calculate a pixel value difference between a first pixel of a first image and a second pixel of a second image, wherein the first image and the second image are a plurality of input frame images used to compute a hologram pattern, and the first pixel and the second pixel have a same coordinate value,
determine at least one pixel, among a plurality of pixels, for which the pixel value difference is lower than a critical value, and
generate a mask of the input frame images for distinguishing the at least one pixel from at least one other pixel in the mask based on the pixel value difference of each pixel among the plurality of pixels; and
a computing unit, among the one or more processor-executable units, configured to compute a hologram pattern of a second image using a computation result for the at least one pixel of the first image based on the mask.

15. An image processing method comprising:
selecting a first frame image of a group of input frame images to be a reference frame;
calculating a pixel value difference between a first pixel of the first frame image and a second pixel of a second frame image of the group of input frame images, wherein the first frame image and the second frame image are used to compute a hologram pattern, and the first pixel and the second pixel have a same coordinate value;
determining at least one pixel, among a plurality of pixels in the group of input frame images, for which the pixel value difference is lower than a critical value, and
generating a mask of the group of input frame images for distinguishing the at least one pixel from at least one other pixel in the mask based on the pixel value difference of each pixel among the plurality of pixels; and
computing a hologram pattern of the second frame image using a computation result of the at least one pixel in the first frame image based on the mask.

16. A non-transitory computer-readable recording medium comprising a program for implementing the image processing method of claim 15.

17. An image processing apparatus comprising:
a processor configured to control one or more processor-executable units;
a determining unit, among the one or more processor-executable units, configured to
calculate a first pixel value difference between a first pixel of a first frame image and a second pixel of a second frame image, wherein the first frame image and the second frame image are a plurality of input frame images used to compute a hologram pattern, and wherein the first pixel and the second pixel have a same coordinate value,
  calculate a second pixel value difference between a third pixel of the first frame and fourth pixel of the second frame, wherein the third pixel and the fourth pixel have a same coordinate value;
  determine that the first pixel value difference is lower than a critical value, and the second pixel value is greater than or equal to the critical value;
  generate a mask of the input frame images, based on the pixel value differences of a plurality of pixels of the plurality of input frame images, for distinguishing the first pixel from the second pixel, and distinguishing the third pixel from the fourth pixel; and
a computing unit, among the one or more processor-executable units, configured to compute a hologram pattern of the second pixel of the second frame image using a computation result of a hologram pattern of the first frame image, and to compute a hologram pattern of the fourth pixel of the second frame image without using the computation result of the hologram pattern of the first frame image.

18. The image processing apparatus of claim 16, further comprising the computing unit synthesizing the hologram pattern of the second pixel of the second frame image and the hologram pattern of the fourth pixel of the second frame image to generate the hologram pattern of the second frame image.

19. The image processing apparatus of claim 1, wherein the threshold is used to determine whether a computation result for the first image may be used to compute the hologram pattern of the second image.

20. The image processing apparatus of claim 1, wherein when the determining unit determines the at least one pixel to have the pixel value difference less than the critical value, the computation result for the first image is used to compute the hologram pattern of the second image, and
  when the determining unit determines the at least one pixel to have the pixel value difference greater than or equal to the critical value, a separate computation, distinct from the computation result for the first image, may be executed to compute the hologram pattern of the second image.

* * * * *